(12) United States Patent
Gibeau et al.

(10) Patent No.: US 11,807,178 B2
(45) Date of Patent: Nov. 7, 2023

(54) BUMPER BEAM HAVING AN INSERT

(71) Applicant: ArcelorMittal, Luxembourg (LU)

(72) Inventors: Elie Gibeau, Pont-Sainte-Maxence (FR); Yannis Kheyati, Saint-Denis (FR); Nabil Menegady, Leamington Spa (GB)

(73) Assignee: ArcelorMittal, Luxembourg (LU)

( * ) Notice: Subject to any disclaimer, the term of this patent is extended or adjusted under 35 U.S.C. 154(b) by 268 days.

(21) Appl. No.: 17/274,054

(22) PCT Filed: Jul. 10, 2019

(86) PCT No.: PCT/IB2019/055866
§ 371 (c)(1),
(2) Date: Mar. 5, 2021

(87) PCT Pub. No.: WO2020/053674
PCT Pub. Date: Mar. 19, 2020

(65) Prior Publication Data
US 2021/0268976 A1 Sep. 2, 2021

(30) Foreign Application Priority Data
Sep. 10, 2018 (WO) .................. PCT/IB2018/056868

(51) Int. Cl.
*B60R 19/18* (2006.01)
(52) U.S. Cl.
CPC ...... *B60R 19/18* (2013.01); *B60R 2019/1866* (2013.01)
(58) Field of Classification Search
CPC .................. B60R 19/18; B60R 2019/1866
See application file for complete search history.

(56) References Cited

U.S. PATENT DOCUMENTS 5,219,197 A * 6/1993 Rich ...................... B60R 19/18
293/121
6,817,638 B1 11/2004 Choi et al.
(Continued)

FOREIGN PATENT DOCUMENTS

CN 1509239 A 6/2004
CN 101096194 A 1/2008
(Continued)

OTHER PUBLICATIONS

International Search Report of PCT/IB2019/055866, dated Jan. 22, 2020.
(Continued)

*Primary Examiner* — Dennis H Pedder
*Assistant Examiner* — Melissa Ann Bonifazi
(74) *Attorney, Agent, or Firm* — Davidson, Davidson & Kappel, LLC (57) ABSTRACT

A cross member for a bumper beam includes an outer beam, an inner reinforcement element extending inside at least a part of the outer beam inner volume and comprising at least two reinforcement ribs protruding towards the front beam wall, the reinforcement ribs being connected together at least at their back end, opposite to the front beam wall, by an upper transversal branch and a lower transversal branch, the upper and lower transversal branches being attached respectively to the upper and lower beam flanges of the outer beam, wherein each reinforcement rib abuts the front beam wall and the length of the upper transversal branch is less than the length of the upper beam wall and the length of the lower transversal branch is less than the length of the lower beam wall, the lengths being measured in the longitudinal direction.

14 Claims, 4 Drawing Sheets

(56) References Cited

U.S. PATENT DOCUMENTS

| | | | |
|---|---|---|---|
| 9,114,767 B2 * | 8/2015 | Jeong | B60R 19/18 |
| 9,598,033 B1 * | 3/2017 | Berger | B60R 19/18 |
| 10,351,085 B2 * | 7/2019 | Munjurulimana | B60R 19/34 |
| 2002/0060462 A1 * | 5/2002 | Glance | F16F 3/0876 |
| | | | 428/34.1 |
| 2002/0149214 A1 | 10/2002 | Evans et al. | |
| 2004/0262930 A1 | 12/2004 | Cumming et al. | |
| 2004/0262931 A1 | 12/2004 | Roussel et al. | |
| 2006/0181089 A1 | 8/2006 | Andre et al. | |
| 2008/0001417 A1 | 1/2008 | Asahi et al. | |
| 2008/0309102 A1 | 12/2008 | Sampaio et al. | |
| 2014/0191520 A1 | 7/2014 | Jeong et al. | |
| 2014/0367982 A1 | 12/2014 | Kano et al. | |
| 2016/0159300 A1 | 6/2016 | Matecki et al. | |
| 2016/0244013 A1 | 8/2016 | Mori et al. | |
| 2017/0369013 A1 | 12/2017 | Muralidharan et al. | |

FOREIGN PATENT DOCUMENTS

| | | | | |
|---|---|---|---|---|
| CN | 101152855 A | | 4/2008 | |
| CN | 101171157 A | | 4/2008 | |
| CN | 104010886 A | | 8/2014 | |
| CN | 105691334 A | | 6/2016 | |
| CN | 106985775 A | * | 7/2017 | ............ B60R 19/03 |
| CN | 107539251 A | | 1/2018 | |
| DE | 60308444 T2 | | 10/2007 | |
| FR | 2836434 A1 | | 8/2003 | |
| FR | 2869276 A1 | | 10/2005 | |
| JP | 2016155438 A | | 9/2016 | |
| KR | 20050001258 A | | 1/2005 | |
| KR | 101495885 A | * | 3/2015 | |
| KR | 101495885 B1 | | 3/2015 | |
| KR | 102107064 B1 | | 5/2020 | |
| KR | 102107064 B1 | * | 5/2020 | |
| RU | 27029 U1 | | 1/2003 | |
| RU | 2270768 C1 | | 2/2006 | |
| WO | WO-2007076096 A3 | * | 12/2007 | ............ B60R 19/18 |
| WO | WO2014069108 A1 | | 5/2014 | |
| WO | WO-2014069108 A1 | * | 5/2014 | ............ B60R 19/18 |
| WO | WO2018092058 A1 | | 5/2018 | |

OTHER PUBLICATIONS

Pascal Dietsch et al. in "Methodology to assess fracture during crash simulation: fracture strain criteria and their calibration", in Metallurgical Research Technology vol. 114, No. 6, 2017.

* cited by examiner

BUMPER BEAM HAVING AN INSERT

The present invention relates to a cross member for a bumper beam for an automotive vehicle. The invention further relates to a method for producing such a cross member.

BACKGROUND

The bumper beam cross member is located at the front and/or at the rear of an automotive vehicle and is generally attached to crash boxes, usually by bolting. The crash boxes are themselves mounted to the vehicle structure. In the case of a front or rear crash, the cross member is the first mechanical element of the vehicle to come into contact with the obstacle. In case of a high-speed crash, the cross member has a function of transmitting the load to the vehicle crash management system. In case of a low speed crash, the crash boxes, on which the cross member is assembled, have a function of absorbing the energy of the crash while protecting the rest of the vehicle structure. In all cases, the cross member is expected to be deformed but not to crack during a crash.

As such, the cross member for the bumper beam needs to be sufficiently resistant to transmit the load of the crash to the crash management system of the vehicle, while at the same time being able to absorb energy without cracking at the point of impact.

In order to ensure the proper behaviour of the cross member during a crash, several standardized tests are defined by official consortiums. For example, the Research Council for Automobile Repair (RCAR) defines a bumper test and a low speed structural crash test. The cross member is also involved in other tests which concern the whole vehicle, such as the "frontal crash full width rigid barrier 50 Km/h" of the Euro NCAP (New Car Assessment Program) and of the IIHS (Insurance Institute for Highway Safety), also known as the full-frontal crash test.

Furthermore, car manufacturers also define their own testing procedures to further improve the evaluation of the cross member. Such tests are not standardized and not publicly available. However, it is known that many car manufacturers have defined a test known as a pole impact test, in which the vehicle is crashed at a low speed, for example around 10 Km/h, against a rigid pole located in the middle of the width of the vehicle. Such a test is intended to simulate small impacts when manoeuvring a vehicle at a low speed.

During such a test, the center portion of the cross member needs to have a sufficient energy absorption capacity and a sufficient ductility at the point of impact in order to deform without cracking under the very localized load applied by the pole during the impact. On the other hand, taking into account for example the full-frontal crash test, the full width of the cross member needs to have sufficient mechanical resistance in order not to fail under the very high load applied by the obstacle and to transmit the energy of the impact to the vehicle crash management system.

It is known from the prior art to include in the design of the shape of the cross member one or more beads, intended to increase the resistance of the cross member to the compressive loads of a crash by delaying the onset of buckling.

The different parts of the cross member are assembled together and the cross member is then bolted to the crash boxes, to form a bumper beam assembly. Said bumper beam assembly is coated by Electro-Deposition (ED) independently of the rest of the vehicle, before being mounted on the rest of the vehicle. The ED-coating process is performed on the bumper beam assembly and not on the individual parts constituting said assembly, because the assembly process involves welding, which would evaporate the ED-coating and leave the welded areas unprotected by said ED-coating.

It is known from the prior art to manufacture a cross member for bumper beam using at least a metallic outer beam and a plastic reinforcement element inserted inside the metallic outer beam. Because the plastic reinforcement element usually cannot resist the high temperatures involved in the ED-coating process, the plastic reinforcement element is necessarily inserted into the outer beam of the cross member after the bumper beam assembly has been ED-coated.

The use of a plastic reinforcement element increases the amount of energy absorbed by the cross member during a crash, without significantly increasing its weight.

However, using a plastic inner reinforcement poses several challenges in terms of manufacturing process and part design. When using over-molding for example, the previously assembled and ED-coated bumper beam assembly must meet very strict geometrical tolerances in order to fit in a tight and leak-proof manner into the over-molding tool. It is very challenging to reach such tight geometrical tolerances on a machine welded assembled system such as the bumper beam assembly and it will require that the manufacturer implement specific, time consuming and costly measures to do so. Even when taking such measures, the manufacturer will be exposed to numerous product quality issues and will face a high amount of rejects. Furthermore, in order to ensure a good collaboration between the outer beam and the reinforcement element, the two parts need to stay bonded during a crash. Ensuring a good adhesion between the parts during an impact requires designing a reinforcement element which comprises a high amount of contact surfaces with the outer beam. This creates the need for surfaces on the reinforcement element which do not necessarily act to absorb energy but only act to ensure a good bonding with the outer beam. In other words, this leads to designing a plastic reinforcement shape which is not optimized for energy absorption. Alternatively, the good bonding between the parts is ensured by implementing additional time-consuming and costly steps in the manufacturing process, such as curing of a heat activated adhesive.

SUMMARY OF THE INVENTION

It is an object of the present invention to provide a cross member for a bumper beam which is optimized in terms of energy absorption and which can be manufactured easily and without specific precautions.

The present invention provides a cross member for a bumper beam comprising:
  an outer beam extending along a transverse direction having a main beam portion comprising an upper beam wall, a lower beam wall and a front beam wall connecting the upper beam wall and the lower beam wall, an upper beam flange and a lower beam flange extending respectively along a back end of the upper beam wall and a back end of the lower beam wall in the transverse direction, said back ends extending opposite to the front beam wall and being spaced from said front beam wall according to a longitudinal direction, said upper beam wall, lower beam wall and front beam wall defining together a beam inner volume open in a back direction opposite to the front beam wall, an inner reinforcement element extending inside at least a part of said beam inner volume, said inner reinforcement element comprising at least two reinforcement ribs protruding towards the front beam wall, said reinforcement ribs being connected together at least at their back end, opposite to the front beam wall, by an upper transversal branch and a lower transversal branch, extending in the transverse direction, said upper and lower transversal branches being attached respectively to the upper and lower beam flanges of the outer beam, wherein each reinforcement rib abuts the front beam wall and the length of the upper transversal branch is less than the length of the upper beam wall and the length of the lower transversal branch is less than the length of the lower beam wall, said lengths being measured in the longitudinal direction.

By applying the invention, it is possible to manufacture a cross member having a metallic outer beam and a plastic reinforcement element in which the two parts collaborate efficiently together by staying bonded during a crash through the high contact area between the parts provided by the contact points between the abutting reinforcement ribs and the front beam wall, while minimizing the amount of plastic material on the transversal branches, which do not act to absorb energy during a crash, and at the same time still preventing the outer beam from opening under the influence of a compressive impact force.

The present invention also concerns a method for producing a cross member, as described above, comprising the steps of:

providing an outer beam, providing an inner reinforcement element, attaching the inner reinforcement element to the outer beam by fastening at least an upper beam flange of the outer beam to an upper transversal branch of the inner reinforcement element and a lower beam flange of said outer beam to a lower transversal branch of said inner reinforcement element.

BRIEF DESCRIPTION OF THE DRAWINGS

Other aspects and advantages of the invention will appear upon reading the following description, given by way of examples, and made in reference to the appended drawings, wherein.

DETAILED DESCRIPTION

In the following description, the terms "upper", "lower", "front", "rear", "transverse" and "longitudinal" are defined according to the usual directions of a mounted vehicle. More particularly, the terms "upper" and "lower", are defined according to the elevation direction of the vehicle, the terms "front", "rear" and "longitudinal" are defined according to the front/rear direction of the vehicle and the term "transverse" is defined according to the width of the vehicle. By "substantially parallel" or "substantially perpendicular" it is meant a direction which can deviate from the parallel or perpendicular direction by no more than 15°.

More particularly, the term "fracture strain", also known as "crash ductility" and the term "critical bending angle", also known as "maximum bending angle" refer to the fracture strain criterion and the critical bending angle criterion defined by Pascal Dietsch et al. in "Methodology to assess fracture during crash simulation: fracture strain criteria and their calibration", in Metallurgical Research Technology Volume 114, Number 6, 2017. The critical bending angle (also known as maximum bending angle) defines the angle at which the first cracks are detected on the extrados of a sample which has been deformed according to the standardized VDA-238-100 Standard. The fracture strain (also known as crash ductility) is the associated equivalent strain within the material at the point of the deformation when the critical bending angle has been reached.

Figure 1:
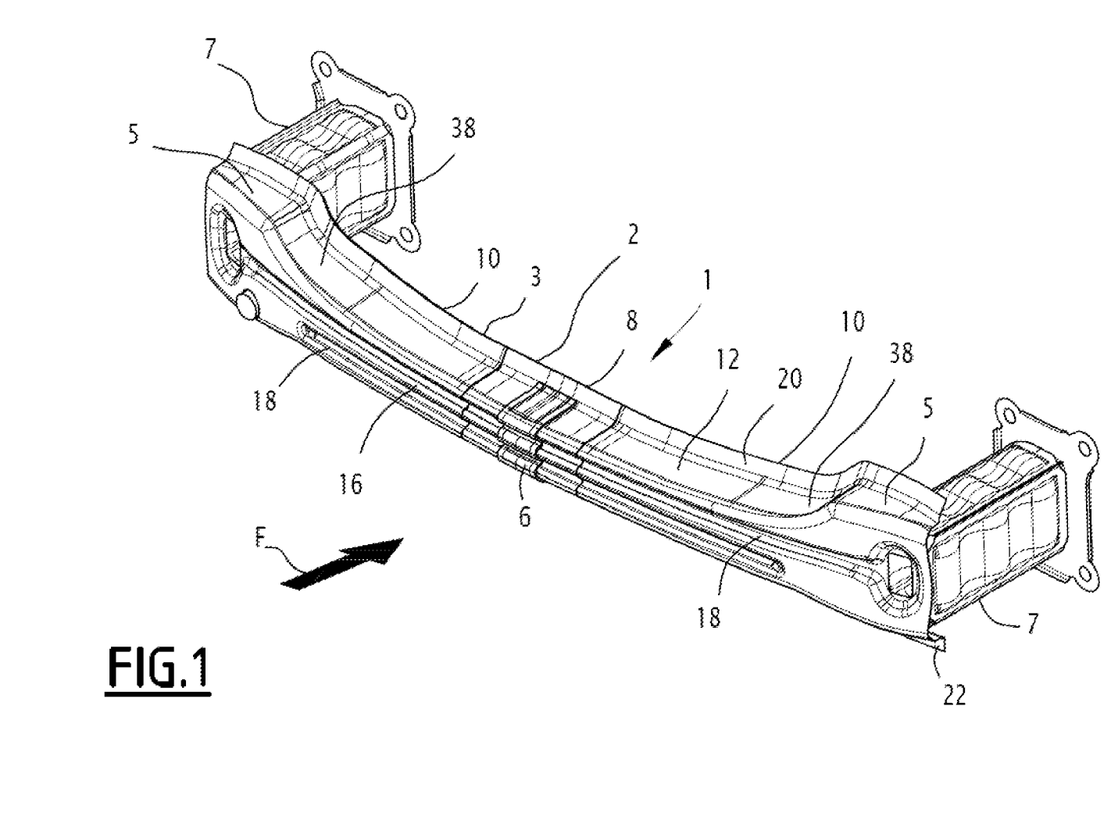
FIG. 1 is a front perspective view of a cross member according to an embodiment of the invention.
Figure 2:
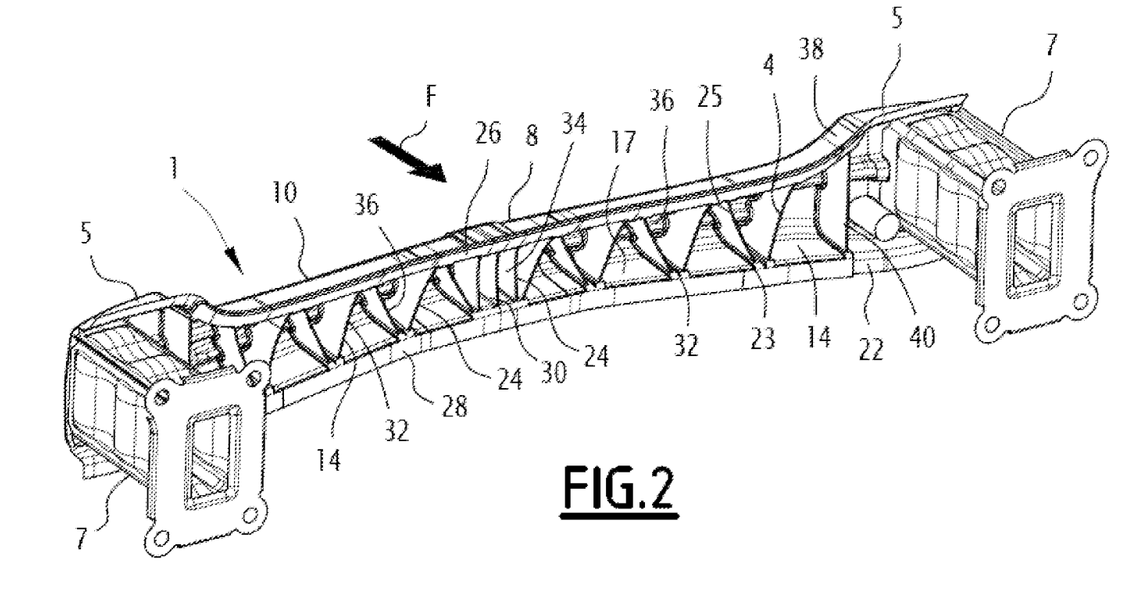
FIG. 2 is a rear perspective view of the cross member of FIG. 1.

Referring to FIGS. 1 and 2, a cross member 1 for a bumper beam of an automotive vehicle is described. The cross member 1 comprises at least an outer beam 2 and an inner reinforcement element 4. According to a particular embodiment, the cross member 1 further comprises an outer reinforcement element 6. The cross member is generally attached to the rest of the vehicle on either side of the outer beam 2, for example via a set of two crash boxes 7. The assembly of the cross member 1 and the crash boxes 7 is called a bumper beam assembly. During a front crash in the case of a front cross member 1 or during a rear crash in the case of a rear cross member 1, the cross member 1 is subjected to a compressive impact force F as depicted in FIGS. 1 and 2.

The outer beam 2 extends along a transverse direction and comprises a main beam portion 3 and two beam end portions 5 extending on either side of the main beam portion 3 along the transverse direction. The shape of the outer beam 2 in said beam end portions 5 can be flat or of any other shape suitable for the assembly of the cross member 1 to the crash boxes 7 as shown in FIG. 2.

The main beam portion 3 comprises two beam transition portions 38 extending on either end of said main beam portion 3 in the transverse direction and having a shape which ensures the transition between the shape of the main beam portion 3 and the two beam end portions 5.

The main beam portion 3 serves to absorb the energy of the compressive impact force F and to resist the intrusion into the vehicle by transmitting said compressive impact force F to the vehicle crash management system. The main beam portion 3 comprises an upper beam wall 12 and a lower beam wall 14, both substantially perpendicular to the elevation direction of the vehicle and a front beam wall 16, joining said upper and lower beam walls 12 and 14 and being substantially perpendicular to said upper and lower beam walls 12 and 14. When the cross member 1 is mounted on a vehicle, the upper and lower beam walls 12 and 14 are for example substantially horizontal. According to a variant, the upper and lower beam walls 12 and 14 extend according to diverging directions from the front beam wall 16 toward the back of the cross member 1.

The upper beam wall 12, lower beam wall 14 and front beam wall 16 define together a beam inner volume 17, which is open facing a back direction opposite to the front beam wall 16. In case of a front cross member, the back direction is oriented toward the rear of the vehicle and, in case of a rear cross member, the back direction is oriented toward the front of the vehicle.

The main beam portion 3 further comprises an upper beam flange 20 extending in a transverse direction along a back end of the upper beam wall 12 and a lower beam flange 22 extending in a transverse direction along a back end of the lower beam wall 14. The back ends of the upper and lower beam walls 12, 14 each extend opposite to the front beam wall 16 in the back direction.

According to a particular embodiment, the outer beam 2 is made of a metallic material, for example steel or aluminum.

According to a particular embodiment, the outer beam 2 has a minimum ultimate tensile strength of 950 MPa in order to resist the high stresses during a crash.

Figure 3:
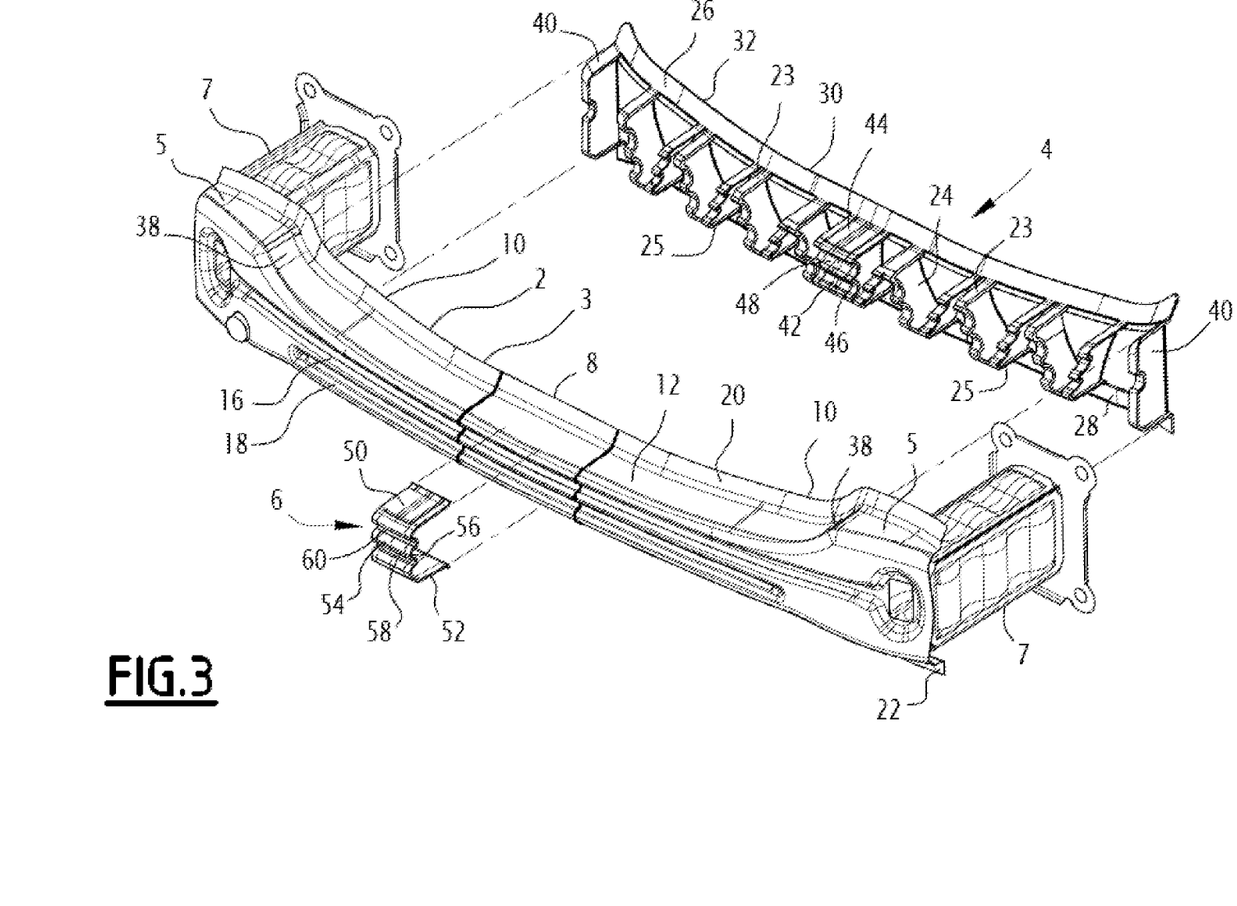
FIG. 3 is an exploded rear perspective view of the cross member of FIG. 1.

According to a particular embodiment, visible in FIGS. 1 to 3, the main beam portion 3 further comprises a central beam portion 8 and two side beam portions 10 extending along either side of said central beam portion 8 in the transverse direction, said central beam portion 8 having a higher crash ductility than said side beam portions 10. In this embodiment, the central beam portion 8 will advantageously accommodate for the very high stress concentration in the center of the cross member 2 during the pole impact test for example by deforming without cracking thanks to its high crash ductility, while the side beam portions 10 will resist deformation, thereby ensuring the physical integrity of the cross member during such pole impact test or during a higher speed impact test such as the full-front crash test.

According to an embodiment, the outer beam 2 is made from a hot stamped tailor welded blank.

The outer beam 2 is for example a press-hardened steel part. More particularly, the central beam portion 8 is for example made of a press-hardening steel having a carbon content comprised between 0.06 wt. % and 0.1 wt. % and a manganese content comprised between 1.4 wt. % and 1.9 wt. %. Even more particularly, the steel composition of the central beam portion 8 may further comprise Nb, Ti, B as alloying elements. The central beam portion 8 is for example made of Ductibor 1000®, which has a crash ductility of at least 0.6, a maximum bending angle of at least 75°, an ultimate tensile strength above 1000 MPa and a yield strength comprised between 700 and 950 MPa.

Each side beam portion 10 is for example made of a press-hardening steel having a tensile strength greater than 1300 MPa. According to an embodiment, the steel composition of the side beam portions 10 comprises for example, in % weight: 0.20%≤C≤0.25%, 1.1%≤Mn≤1.4%, 0.15%≤Si≤0.35%, ≤Cr≤0.30%, 0.020%≤Ti≤0.060%, 0.020%≤Al≤0.060%, S≤0.005%, P≤0.025%, 0.002%≤B≤0.004%, the remainder being iron and unavoidable impurities resulting from the elaboration. With this composition range, the tensile strength of the side beam portions 10 after press-hardening is comprised between 1300 and 1650 MPa.

According to another embodiment, the steel composition of the side beam portions 10 comprises for example, in % weight: 0.24%≤C≤0.38%, 0.40%≤Mn≤3%, 0.10%≤Si≤0.70%, 0.015%≤Al≤0.070%, Cr≤2%, 0.25%≤Ni≤2%, 0.015%≤Ti≤0.10%, Nb≤0.060%, 0.0005%≤B≤0.0040%, 0.003%≤N≤0.010%, S≤0.005%, P≤0.025%, %, the remainder being iron and unavoidable impurities resulting from the elaboration. With this composition range, the tensile strength of the side beam portions 10 after press-hardening is higher than 1800 MPa.

For example, the side beam portions 10 are made of Usibor 1500® or Usibor 2000®.

According to a further particular embodiment, as shown in FIG. 1, the front beam wall 16 comprises beads 18 each extending along the transverse direction over at least part of the width of the outer beam 2 and positioned one above the others in the elevation direction. Said beads 18 can advantageously increase the resistance of the outer beam 2 under compressive loading by delaying the onset of buckling, because their geometry comprises elements which are substantially parallel to the compressive impact force F during a crash.

The inner reinforcement element 4 depicted in FIGS. 1 to 3 extends inside at least part of the beam inner volume 17. The inner reinforcement element 4 comprises at least two reinforcement ribs 24 protruding towards the front beam wall 16. Said reinforcement ribs 24 abut the front beam wall 16 on their front end and are connected together at least at their back end, opposite to the front beam wall 16, by an upper transversal branch 26 and a lower transversal branch 28, extending in the transverse direction, said upper and lower transversal branches 26 and 28 being attached respectively to the upper and lower beam flanges 20 and 22 of the outer beam 2. For example, the front end of each reinforcement rib 24 has a shape which substantially matches the shape of the front beam wall 16 in the area where said reinforcement rib 24 abuts said front beam wall 16. For example, this means that when the front beam wall 16 presents beads 18, the shape of the front end of the reinforcement rib 24 will generally follow the shape of said beads 18 as shown in FIG. 3.

In a particular embodiment, the inner reinforcement element 4 comprises a center reinforcement portion 30 and two side reinforcement portions 32 extending on either side of said center reinforcement portion 30 along the transverse direction. Said center reinforcement portion 30 defines a center reinforced beam inner volume 34 within the beam inner volume 17 and said side reinforcement portions 32 each define a side reinforced beam inner volume 36 within the beam inner volume 17.

The presence of the upper and lower transversal branches 26 and 28 advantageously ensures that the inner reinforcement element 4 is made in a single part, has good structural integrity on its own and is self-supporting, before being attached to the outer beam 2. This ensures that said inner reinforcement 4 is easy to produce, to store and to manipulate prior to being attached to the outer beam 2.

Also, when the compressive impact force F is applied locally to the front beam wall 16, for example in the center of said front beam wall 16 in case of the pole impact test, the upper and lower transversal branches 26 and 28 further serve to ensure that the load coming from the compressive impact force F is distributed in a transverse direction within the inner reinforcement element 4 and therefore ensures that all the reinforcement ribs 24 contribute to the energy absorption and not only the reinforcement ribs 24 localized in the area in which the compressive impact force F is applied.

Furthermore, during a crash, as a result of the compressive impact force F applied to the front beam wall 16, the outer beam 2 has a tendency to open itself in the elevation direction, in other words the compressive impact force F acts to increase the angle between the upper beam wall 12 and the front beam wall 16 and to increase the angle between the lower beam wall 14 and the front beam wall 16. In other words, in case of an impact, the upper and lower beam walls 12 and 14 tend to move away from one another in diverging directions. Such an opening of the outer beam 2 has the effect of lowering the amount of energy absorbed by the cross member 1 because the upper and lower walls 12 and 14 are pried away from the direction of the compressive impact force F instead of staying substantially parallel to said compressive impact force F. In other words, the energy absorbed through the unbending motion of the outer beam 2 by the compressive impact force F, when said compressive impact force F is allowed to pry open said outer beam 2, is far less than the energy absorbed by the resistance to said compressive impact force F of the lower and upper walls 12 and 14, when said walls 12 and 14 stay substantially parallel to the compressive impact force F during a crash. Advantageously, because the inner reinforcement 4 provides a link between the upper and lower beam flanges 20 and 22 through the upper and lower transversal branches 26 and 28, which are themselves connected to the reinforcement ribs 24, the inner reinforcement element 4 counteracts this opening effect of the compressive impact force F and helps to ensure that the upper and lower walls 12 and 14 stay substantially parallel to the impact force F during a crash.

As can be seen in the description above, the upper and lower transversal branches 26 and 28 contribute to energy absorption during a crash through the adhesion of said transversal branches to the upper and lower beam flanges 20 and 22 and through the link they provide between the reinforcement ribs 24. In other words, the upper and lower transversal branches 26 and 28 are not expected in themselves to absorb mechanical energy during a crash, rather they are expected to indirectly improve energy absorption by promoting a good cohesion and therefore a good collaboration of the reinforcement ribs 24 with each other and of the inner reinforcement element 4 with the outer beam 2. Taking this into account, it is not necessary for the transversal branches 26 and 28 to have a large component extending in a direction substantially parallel to the compressive impact force F, which is the direction in which the energy of the compressive impact force F is absorbed. It is therefore a characteristic of the invention that the length of the upper transversal branch 26 is less than the length of the upper beam wall 12 and the length of the lower transversal branch 28 is less than the length of the lower beam wall 14, said lengths being measured in the longitudinal direction. By limiting the lengths of the transversal branches 26 and 28 in the longitudinal direction, i.e. in a direction substantially parallel to the compressive impact force F, the design of the transversal branches 26 and 28 is optimized to suit their cohesion role in the case of a crash, thereby optimizing the production process and the production costs, by reducing the amount of material involved in the production of the inner reinforcement element 4.

According to an embodiment, the transversal branches 26 and 28 extend only on the upper and lower beam flanges 20 and 22. In other words, the transversal branches 26 and 28 do not extend in the longitudinal direction substantially parallel to the compressive impact force F on the upper and lower beam walls 12 and 14.

According to another embodiment shown in FIGS. 2 and 3, the length of the upper transversal branch 26 is comprised between 1% and 30% of the length of the upper beam wall 12 and the length of the lower transversal branch 28 is comprised between 1% and 30% of the length of the lower beam wall 14, said lengths being measured in the longitudinal direction. The minimum value of the lengths of the transversal branches 26 and 28 is given by the fact that it can be advantageous during the assembly process of the inner reinforcement element 4 to the outer beam 2 to have a small portion of the transversal branches 26 and 28 extending in the longitudinal direction so as to form a wedge which will facilitate the prehension and fitting of the inner reinforcement element 4 into the beam inner volume 17, as will be described subsequently. On the other hand, the maximum value of the lengths of the transversal branches 26 and 28 is dictated by the need to optimize the size of the transversal branches 26 and 28 in order to optimize the production process and production costs of the inner reinforcement element 4. For example, in the case of an upper and lower beam walls 12 and 14 measuring 70 mm in the longitudinal direction, the length of the transversal branches 26 and 28 is comprised between 0.7 mm and 21 mm.

In a particular embodiment, the upper transversal branch 26 extends only on the back end of the upper beam wall 12 and on the upper beam flange 20 and the lower transversal branch 28 extends only on the back end of the lower beam wall 14 and on the lower beam flange 22, meaning that the upper and lower transversal branches 26 and 28 do not extend in the front portion of the upper and lower beam walls 12 and 14. The presence of a portion of the transversal branches 26 and 28 on the back end of the upper and lower beam walls 12 and 14 can serve to facilitate the fitting process of the inner reinforcement 4 in the beam inner volume 17, as will be detailed subsequently.

Thanks to their orientation, which is substantially parallel to the compressive impact force F, the reinforcement ribs 24 contribute to increase the energy absorbed by the cross member 1 under the effect of the compressive impact force F. Thanks to the fact that the reinforcement ribs 24 abut the front beam wall 16, said reinforcement ribs 24 will start to absorb energy right at the onset of the crash, thereby optimizing the amount of absorbed energy.

In a particular embodiment, the reinforcement ribs 24 are arranged in a series of V-shapes along at least part of the width of the inner reinforcement element 4, as is the case of the side reinforcement portions 32 of the inner reinforcement element 4 depicted in FIG. 2. In this configuration, two consecutive reinforcement ribs 24 are adjacent to each other and form an angle α with each other. Advantageously, in such a configuration, the front end of the reinforcement ribs 24 cover a large surface area of the front beam wall 16, which contributes to a good energy absorption during a crash and a good bonding between the inner reinforcement element 4 and the outer beam 2, while at the same time minimizing the total volume of the inner reinforcement element 4, which facilitates the production process and lowers the production and material costs.

In a particular embodiment, the reinforcement ribs 24 are all oriented in the same direction in at least part of the inner reinforcement element 4, as is the case of the center reinforcement portion 30 of the inner reinforcement element 4 depicted in FIG. 2. In this configuration, said reinforcement ribs 24 are all substantially parallel to each other. Advantageously, such a configuration allows to fit a high amount of reinforcement ribs 24 in a given volume, thereby increasing the volumetric density of the reinforcement ribs in said volume, which in turn increases the energy absorption contribution of the inner reinforcement element 4 in this area. By volumetric density in a given volume it is meant the ratio between the volume occupied by the inner reinforcement element 4 in the given volume and the total volume of the given volume. For example, this configuration is used in the center reinforcement portion 30 in order to increase the energy absorption in the case of a pole impact test, in which the compressive impact force F is applied to the center of the cross member 1.

In a particular embodiment, the reinforcement ribs 24 cross each other in at least part of the inner reinforcement element 4. For example, the reinforcement ribs 24 form an X-shape pattern between each other. In other words, the reinforcement ribs 24 cross each other along a line extending in the longitudinal direction and form a non-zero angle with each other. Advantageously, such a configuration allows to fit a high amount of reinforcement ribs 24 in a given volume, thereby increasing the volumetric density of the reinforcement ribs 24 in said volume, which in turn increases the energy absorption contribution of the inner reinforcement element 4 in this area. For example, this configuration is used in the center reinforcement portion 30 in order to increase the energy absorption in the case of a pole impact test, in which the compressive impact force F is applied to the center of the cross member 1.

It should be noted that the embodiments described above can be combined with each other in a single inner reinforcement element 4. For example, as shown in FIGS. 2 and 3, the side reinforcement portions 32 comprise reinforcement ribs 24 arranged in a V-shape, whereas the center reinforcement portion 30 comprises reinforcement ribs 24 which are parallel to each other. By combining different reinforcement rib patterns, the behavior of the inner reinforcement element 4 can be optimized according to the requirements in each area of the cross member 1.

In a particular embodiment, at least some of the reinforcement ribs 24 comprise an upper end 23 abutting the upper beam wall 12 and a lower end 25 abutting the lower beam wall 14. Advantageously, in such a configuration, the reinforcement ribs 24 span the full height of the outer beam 2 measured in the elevation direction, which ensures that the reinforcement ribs 24 cover a large surface area of the front beam wall 16, thereby contributing to a good energy absorption during a crash and a good bonding between the inner reinforcement element 4 and the outer beam 2. Furthermore, in this configuration, it is possible to attach the upper end 23 of the reinforcement ribs 24 to the upper wall 12 and to attach the lower end 25 of the reinforcement ribs 24 to the lower wall 14 for example by adhesive bonding, thereby increasing the adhesion between the inner reinforcement element 4 and the outer beam 2, which contributes to promote the collaboration between the inner reinforcement element 4 and the outer beam 2 and which further counteracts the above described opening effect of the compressive impact force F on the outer beam 2.

In a particular embodiment, when reinforcement ribs 24 are attached on their upper end 23 to the upper beam wall 12 and on their lower end 25 to the lower beam wall 14, said reinforcement ribs 24 have a wall thickness in their upper end 23 and lower end 25 which is greater than the wall thickness away from their upper end 23 and lower end 25, as more particularly visible in FIG. 3. By wall thickness of the reinforcement rib 24, it is meant the thickness measured in a direction substantially perpendicular to the plane defined by said reinforcement rib 24. Advantageously, this allows to increase the contact area between the upper end 23 of the reinforcement rib 24 and the upper wall 12 and between the lower end 25 of the reinforcement rib 24 and the lower wall 14, thereby increasing the adhesion of the inner reinforcement element 4 to the outer beam 2 and thus promoting the collaboration between said inner reinforcement element 4 and said outer beam 2 in the case of a crash. Advantageously, by specifying different wall thicknesses between the upper and lower ends 23, 25 of the reinforcement ribs 24 and the areas away from said ends, it is possible to optimize the amount of material used to manufacture the reinforcement ribs 24 and therefore the production process and costs of the inner reinforcement element 4, by optimizing separately the adhesion of said reinforcement ribs 24 to the upper and lower beam walls 12 and 14, which is linked to the wall thickness of the reinforcement ribs 24 in their upper end 23 and lower end 25, and the energy absorption contribution of said reinforcement ribs 24, which is linked to the wall thickness of the reinforcement ribs 24 away from their upper and lower ends.

In a particular embodiment, the reinforcement ribs 24 have a constant cross section along the longitudinal direction. In other words, the wall thickness of the reinforcement ribs 24 measured along a line extending along the longitudinal direction is constant. Advantageously, this allows to optimize the energy absorption of the reinforcement ribs 24. Indeed, if the thickness of said reinforcement ribs 24 decreases in the longitudinal direction, the resistance of said reinforcement ribs 24 to the compressive impact force F, which is itself substantially parallel to the longitudinal direction, will decrease in the longitudinal direction. It should be noted that it would not be possible to produce an inner reinforcement element 4 with reinforcement ribs 24 having a constant cross section along the longitudinal direction by over-molding of the inner reinforcement element 4 on the outer beam 2, because the demolding step of the process requires to have a decreasing wall thickness of the reinforcement ribs 24 in the longitudinal direction toward the back, as known by the man of the art.

In a particular embodiment, the inner reinforcement element 4 further comprises a reinforcement casing 42, depicted in FIG. 3, extending in the inner reinforcement element 4 along the transverse direction. Said reinforcement casing 42 comprises an upper reinforcement casing wall 44, a lower reinforcement casing wall 46 and a front reinforcement casing wall 48 connecting said upper and lower reinforcement casing walls 44 and 46. Said upper and lower reinforcement casing walls 44 and 46 extend respectively along part of the upper and lower beam walls 12 and 14 along the transverse direction and abut said upper and lower beam walls 12 and 14. Said front reinforcement casing wall 48 extends along at least part of the front beam wall 16 in the transverse direction and abuts said front beam wall 16. The shape of the front reinforcement casing wall 48 generally follows the shape of the front beam wall 16. In particular if the front beam wall 16 presents beads 18, the shape of the front reinforcement casing wall 48 follows said reinforcement beads 18 so as to abut the front beam wall 16 also within said beads 18, as shown in FIG. 3. The reinforcement casing 42 comprises reinforcement ribs 24, which span the full height of the outer beam 2 in the elevation direction and link the upper and lower reinforcement casing walls 44 and 46, as shown in FIG. 2. The front end of said reinforcement ribs 24 is formed by the reinforcement casing front wall 48. Since the reinforcement casing front wall 48 abuts the front beam wall 16, the front end of the reinforcement ribs 24 comprised within the reinforcement casing 42 also abuts the front beam wall 16. In a particular embodiment, the upper, lower and front reinforcement casing walls 44, 46 and 48 are attached respectively to the upper, lower and front beam walls 12, 14 and 16, for example by adhesive bonding. Advantageously, this increases the adhesion contact area between the outer beam 2 and the inner reinforcement element 4, thereby promoting the collaboration between the two parts. Furthermore, in this case, because the upper and lower reinforcement casing walls 44 and 46 are connected by reinforcement ribs 24, the reinforcement casing 42 will also counteract the above described opening effect of the compressive impact force F on the outer beam 2. For example, the inner reinforcement element 4 comprises a reinforcement casing 42 in the center reinforcement portion 30, as depicted in FIG. 3. Advantageously, this allows for an increase in energy absorption of the reinforcement element 4 in the center reinforcement portion 30, which is subject to localized stresses during the pole impact test for example.

In a particular embodiment, the width of the inner reinforcement 4 is substantially equal to the width of the main beam portion 3 along the transverse direction. Advantageously, this allows to maximize the energy absorption contribution of the inner reinforcement element 4 during a crash. In this case, the upper and lower transversal branches 26 and 28 can also have a width substantially equal to the width of the main beam portion 3. In this case the inner reinforcement element 4 comprises for example two end reinforcement portions 40 located in the two beam transition portions 38. In a particular embodiment, the shape of the reinforcement ribs 24 in said end reinforcement portions 40 is different than the shape of the reinforcement ribs 24 in the rest of the inner reinforcement element 4, to accommodate for the specific shape of the beam transition portions 38 and to maximize the length of the reinforcement ribs 24 in said end reinforcement portions 40, which in turns maximizes the energy absorption contribution of the reinforcement ribs 24.

In a particular embodiment, as depicted in FIGS. 2 and 3, the volumetric density of the inner reinforcement element 4 within the center reinforced beam volume 30 is greater than the volumetric density of the inner reinforcement element 4 within the side reinforced beam volumes 32. The energy absorption contribution of the inner reinforcement element 4 increases with the volumetric density of said inner reinforcement element 4. Advantageously, in the case of a pole impact test for example, a higher volumetric density of the inner reinforcement element 4 in the center reinforced beam volumes 30 will allow to increase the energy absorption in the center of the cross member 1 to accommodate for the localization of the compressive impact force F in the center of the cross member 1. The volumetric density of the inner reinforcement element 4 can be adjusted by adjusting the number of reinforcement ribs 24 and/or by adjusting the wall thickness of the reinforcement ribs 24.

In a particular embodiment, the volumetric density of the inner reinforcement element 4 in the center reinforced beam volume 30 is comprised between 15% and 50% and the volumetric density of the inner reinforcement element 4 in the side reinforced beam volumes 32 is comprised between 5% and 50%. The minimum volumetric density in the center reinforced beam volume 30 is defined by the need to resist to the localization of the compressive impact force F in case of the pole impact test for example. The minimum volumetric density in the side reinforced beam volumes 32 is defined by the need to have a minimum amount of reinforcement ribs 24 present in the rest of the inner reinforcement element 4 in order to resist to the compressive impact force F and to distribute the load applied by said compressive impact force F within the cross member 1. The maximum value of the volumetric density in both the center and the outer reinforced beam volumes 30 and 32 is defined by the need to optimize the amount of material used to manufacture the inner reinforcement element 4, thereby optimizing the production process and production costs of said inner reinforcement element 4.

In a particular embodiment the inner reinforcement element 4 is made of plastic material. Advantageously, the use of plastic can ensure a good energy absorption contribution of the inner reinforcement element 4 without adding much weight to the cross member 1. For example, the inner reinforcement element 4 is made of polypropylene 108 (PP108). The plastic material can also be reinforced by fibers, such as glass fibers.

In a particular embodiment, the minimum tensile strength of the inner reinforcement element 4 is 17 MPa.

In a particular embodiment, the inner reinforcement element 4 is attached to the outer beam 2 at least through the upper and lower transversal branches 26 and 28 by adhesive bonding. According to an embodiment, the inner reinforcement element 4 can be further attached to the outer beam 2 through the upper and lower ends 23 and 25 of the reinforcement ribs 24 and/or through the front ends of the reinforcement ribs 24 and/or through the upper, lower and front walls of the reinforcement casing 42 by adhesive bonding.

In a particular embodiment, the adhesion strength in the attachment areas between the inner reinforcement element 4 and the outer beam 2 is greater than 10 MPa, as measured by the lap shear test.

In a particular embodiment, the cross member 1 further comprises an outer reinforcement element 6, extending in a transverse direction and attached to at least a part of the outer beam 2 outside of the beam inner volume 17, as depicted in FIGS. 1 and 3. Said outer reinforcement element 6 comprises an outer reinforcement upper wall 50, an outer reinforcement lower wall 52, said outer reinforcement upper and lower walls 50 and 52 being connected by an outer reinforcement front wall 54. The outer reinforcement upper, lower and front walls 50, 52 and 54 extend along respectively the upper, lower and front beam walls 12, 14 and 16 in the transverse direction and abut said upper, lower and front beam walls 12, 14 and 16. Furthermore, the outer reinforcement upper, lower and front walls 50, 52 and 54 are attached to the upper, lower and front beam walls 12, 14 and 16, for example by adhesive bonding. The outer reinforcement front wall 54 comprises a back face 56, applied against the front beam wall 16 and a front face 58, facing in the opposite direction. The back face 56 has a shape which generally follows the shape of the front beam wall 16. In particular, if the front beam wall 16 comprises beads 18, the back face 56 will have a shape which follows said beads 18. The front face 58 has a shape which can differ from the shape of the back face 56. For example, as depicted in FIGS. 1 and 3, the front face comprises outer reinforcement ribs 60, which extend in a direction substantially parallel to the elevation direction. Advantageously, the presence of the outer reinforcement element 6 serves to act as a buffer during a crash. In particular, when the compressive impact force F is localized, as is the case for example in the pole impact test, the presence of the outer reinforcement element 6 in the area where the compressive impact force F is applied serves to protect locally the outer beam 2, thereby relieving some of the stress on said outer beam 2 and delaying the formation of cracks during a crash.

In a particular embodiment, the width of the outer reinforcement element 6 is less than the width of the main beam portion 3 of the outer beam 2 along the transverse direction. For example, the width of the outer reinforcement element 6 will be limited to the width of the surface of impact between the pole and the cross member 1 in the case of a pole impact test. Advantageously, in this embodiment the outer reinforcement element 6 plays its buffer role during the pole impact test, while having a limited size, thereby facilitating the production process and lowering the production costs.

In a particular embodiment, the outer reinforcement element 6 is made of plastic material. Advantageously, the use of plastic can ensure a good energy absorption contribution of the outer reinforcement element 6 without adding much weight to the cross member 1. For example, the outer reinforcement element 6 is made of the same material as the inner reinforcement element 4, for example PP108.

In a particular embodiment, the minimum tensile strength of the outer reinforcement element 6 is 17 MPa.

In a particular embodiment, the adhesion strength in the attachment areas between the outer reinforcement element 6 and the outer beam 2 is greater than 10 MPa, as measured by the lap shear test.

In a particular embodiment, the outer beam 2 is made by hot stamping of a tailor welded bland and comprises a center beam portion 8 made in Ductibor 1000® and having a thickness comprised between 0.7 mm and 1.1 mm and two side beam portions 10 made in Usibor 1500® and having a thickness comprised between 1.2 mm and 1.6 mm, and the inner and outer reinforcement elements 4 and 6 are both made of PP108.

It should be noted that, as already known, the outer beam 2 may have a curved shape along the transverse direction. In this case, the inner reinforcement element 4 and the outer reinforcement element 6 may also have a corresponding curved shape along the transverse direction.

The cross member for a bumper beam described above, comprising an outer beam and an inner reinforcement element with reinforcement ribs abutting the front beam wall and transversal branches attached to the beam flanges, presents multiple advantages, among which the possibility to optimize separately the crash absorption capacity of the different components of the inner reinforcement element and the adhesion of said inner reinforcement element to the outer beam, taking also into consideration the optimization of the production process and production costs.

Another advantage of said cross member is the possibility to easily attach said inner reinforcement element to said outer beam, even after the outer beam has been integrated into the bumper beam assembly and said bumper beam assembly has been ED-coated, as will be seen in the description of the method for producing the above described cross member.

Figure 4:
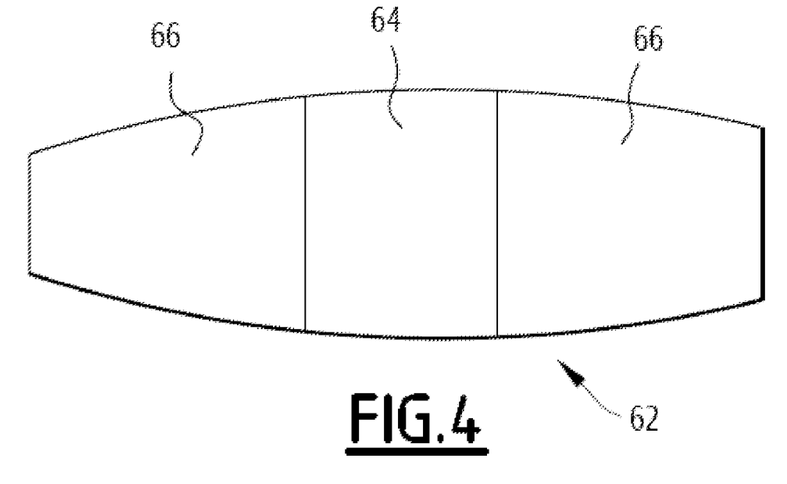
FIG. 4 is a front view of a blank for forming the outer beam of a cross member according to an embodiment of the invention.

The method comprises a step of providing an outer beam 2. For example, the outer beam 2 is made by hot stamping of a steel blank 62. In a particular embodiment of the present invention shown in FIG. 4, the outer beam 2 is made by hot stamping of a tailor welded blank having a central blank portion 64 and two side blank portions 66 extending in a transverse direction on either side of said center blank portion 64. After hot stamping, the central blank portion 64 and the side blank portions 66 will correspond respectively to a central beam portion 8 and two side beam portions 10. For example, as described above, said central beam portion 8 is made of Ductibor 1000® and said side beam portions 10 are made of Usibor 1500®. Advantageously, this allows to produce in a single step an outer beam 2 comprising a central beam portion 8 having a high crash ductility and two side beam portions 10 having a very high mechanical resistance. Furthermore, by choosing a steel grade having a very high mechanical resistance for the side beam portions 10, it is possible to reach a high mechanical resistance of the side beam portions 10 with a low thickness of steel, thereby contributing to minimizing the weight of the cross member 1.

According to a variant, the outer beam 2 is made by hot stamping of a tailored roll blank.

After being produced, the outer beam 2 is assembled to crash boxes 7 in order to form a bumper beam assembly and the bumper beam assembly is subsequently ED-coated to protect it from corrosion. Said bumper beam assembly is ED-coated independently of the rest of the vehicle, before being mounted on the rest of the vehicle. The ED-coating process is performed on the bumper beam assembly and not on the individual parts constituting said assembly, because the assembly process involves welding, which would evaporate the ED-coating and leave the welded areas unprotected by said ED-coating.

The method further comprises a step of providing an inner reinforcement element 4. In a particular embodiment in which the inner reinforcement element 4 is made of plastic, the method for producing the inner reinforcement element 4 is for example injection molding in a stand-alone die. Advantageously, injection molding allows for very high productivity in the manufacturing of the inner reinforcement element 4.

The method further comprises a step of attaching the inner reinforcement element 4 to the outer beam 2 by fastening at least an upper transversal branch 26 of the inner reinforcement element 4 to an upper beam flange 20 of the outer beam 2 and a lower transversal branch 28 of said inner reinforcement element 4 to a lower beam flange 22 of said outer beam 2, for example by adhesive bonding.

According to an embodiment, the inner reinforcement element 4 can be further attached to the outer beam 2 through upper and lower ends 23 and 25 of reinforcement ribs 24 and/or through front ends of said reinforcement ribs 24 and/or through upper, lower and front reinforcement casing walls 44, 46 and 48 of a reinforcement casing 42 by for example adhesive bonding.

According to an embodiment, the reinforcement element 4 is force-fitted into a beam inner volume 17 of the outer beam 2. The use of force fitting can be for example combined with adhesive bonding. Advantageously, this ensures a very good and tight contact between the inner reinforcement element 4 and the outer beam 2, thereby promoting a good adhesion between the parts. When choosing to apply force fitting, it can be advantageous to design the transversal branches 26 and 28 with a small portion extending in the longitudinal direction so as to form a wedge which will facilitate the prehension and fitting of the inner reinforcement element 4 by the force fitting tool.

In a particular embodiment, the step of attaching the inner reinforcement element 4 to the outer beam 2 is performed after the step of integrating the outer beam 2 in the bumper beam assembly and after the step of ED-coating said bumper beam assembly. Advantageously, this allows for a large freedom of choice in the material used to manufacture the inner reinforcement element 4 and in the technology used to attach the inner reinforcement element 4 to the outer beam 2. Indeed, the ED-coating process comprises a step of baking the coating in a furnace at a high temperature, for example above 180° C. If the inner reinforcement element 4 is attached to the outer beam 2 prior to ED-coating, the choice of materials for the inner reinforcement element 4 will be limited to materials resisting temperatures above 180° C. When using for example a plastic material for the inner reinforcement element 4, this limits the choice to thermally resistant plastics, which are costly and do not necessarily present the required mechanical characteristics and formability characteristics which would be optimal for the inner reinforcement element 4. Likewise, if the inner reinforcement element 4 is attached to the outer beam 2 prior to ED-coating, the choice of technologies to attach the two parts will also be limited. When choosing for example adhesive bonding, this limits the choice to adhesives which resist temperatures above 180° C. Using such adhesives represents an additional cost and also requires taking specific measures during assembly. It should be noted that if the inner reinforcement element 4 is attached to the outer beam 2 after said outer beam 2 has been integrated in the bumper beam assembly and has been ED-coated, it will be very difficult to manufacture the inner reinforcement element 4 by over-molding onto the outer beam 2. Indeed, the over-molding process requires a very precise fit between the over-molding tool and the outer beam in order to reach the desired pressure within the tool and in order to prevent leaks of plastic material outside of the outer beam 2. Such a tight fit requires to reach very high reproducible geometrical tolerances on the full bumper beam assembly. However, because said bumper beam assembly comprises for example several metallic parts and said metallic parts are assembled for example by machine welding to each other, said bumper beam assembly will necessarily present some geometrical dispersions. The reduction of said geometrical dispersions will require the manufacturer to implement some costly and time-consuming measures in the production of the individual parts, in the assembly of said parts to form the bumper beam assembly and in the implementation of the over-molding process itself. Even when applying such measures, it is likely that the production process will still have quality issues and that the manufacturer will be faced with many maintenance issues and with a high amount of factory rejects. Furthermore, the use of over-molding imposes some limitations on the design of the inner reinforcement element 4, such as a decreasing wall thickness of the reinforcement ribs 24 toward the back, as explained previously.

According to an embodiment, the method further comprises the step of providing an outer reinforcement element 6. The method then further comprises a step of attaching outer reinforcement upper, lower and front walls 50, 52 and 54 to the upper, lower and front beam walls 12, 14 and 16, for example by adhesive bonding.

In a particular embodiment, the step of attaching the outer reinforcement element 6 to the outer beam 2 is performed after the step of integrating the outer beam 2 in the bumper beam assembly and after the step of ED-coating said bumper beam assembly, for the same reasons as described above.

What is claimed is:

1. A cross member for a bumper beam for an automotive vehicle comprising:
    an outer beam extending along a transverse direction having a main beam portion including an upper beam wall, a lower beam wall and a front beam wall connecting the upper beam wall and the lower beam wall, an upper beam flange and a lower beam flange extending respectively along a back end of the upper beam wall and a back end of the lower beam wall in the transverse direction, the back ends extending opposite to the front beam wall and being spaced from the front beam wall according to a longitudinal direction, the upper beam wall, lower beam wall and front beam wall defining together a beam inner volume open in a back direction opposite to the front beam wall;
    an inner reinforcement element extending inside at least a part of the beam inner volume, the inner reinforcement element including at least two reinforcement ribs protruding towards the front beam wall, the reinforcement ribs being connected together at least at back ends, opposite to the front beam wall, by an upper transversal branch and a lower transversal branch, extending in the transverse direction,
    the upper and lower transversal branches being attached respectively to the upper and lower beam flanges of the outer beam,
    each of the at least two reinforcement ribs abutting the front beam wall and a length of the upper transversal branch being less than a length of the upper beam wall and a length of the lower transversal branch being less than a length of the lower beam wall, the lengths being measured in the longitudinal direction.

2. The cross member as recited in claim 1 further comprising an outer reinforcement element attached to the outer beam outside and opposite to the beam inner volume.

3. The cross member as recited in claim 1 wherein the outer beam is made of metal and the inner reinforcement element is made of plastic.

4. The cross member as recited in claim 2 wherein the outer reinforcement element is made of plastic.

5. The cross member as recited in claim 1 wherein the upper transversal branch extends only on the back end of the upper beam wall and on the upper beam flange and wherein the lower transversal branch extends only on the back end of the lower beam wall and on the lower beam flange.

6. The cross member as recited in claim 1 wherein each of the at least two reinforcement ribs includes an upper end abutting the upper beam wall and a lower end abutting the lower beam wall.

7. The cross member as recited in claim 1 wherein the inner reinforcement element further includes a center reinforcement portion and two side reinforcement portions extending on either side of the center reinforcement portion along the transverse direction, the center reinforcement portion defining a center reinforced beam inner volume within the beam inner volume and the side reinforcement portions each defining a side reinforced beam inner volume within the beam inner volume, and wherein a volumetric density of the inner reinforcement element within the center reinforced beam inner volume is greater than a volumetric density of the inner reinforcement element within the side reinforced beam inner volumes.

8. The cross member as recited in claim 1 wherein the inner reinforcement element further includes a center reinforcement portion and two side reinforcement portions extending on either side of the center reinforcement portion along a transverse direction, the center reinforcement portion defining a center reinforced beam inner volume within the beam inner volume and the side reinforcement portions each defining a side reinforced beam inner volume within the beam inner volume, and wherein a volumetric density of the inner reinforcement element within the center reinforced beam inner volume is between 15% and 50% and wherein a volumetric density of the inner reinforcement element within the side reinforced beam inner volumes is between 5% and 50%.

9. The cross member as recited in claim 1 wherein an adhesion strength in attachment areas between the inner reinforcement element and the outer beam is greater than 10 MPa, as measured by the lap shear test.

10. The cross member as recited in claim 2 wherein an adhesion strength in attachment areas between the outer reinforcement element and the outer beam is greater than 10 MPa, as measured by the lap shear test.

11. The cross member as recited in claim 1 wherein the outer beam has a minimum tensile strength of 950 MPa.

12. The cross member as recited in claim 1 wherein the main beam portion includes a central beam portion and two side beam portions extending along the transverse direction on either side of the central beam portion, the central beam portion having a crash ductility of at least 0.6 and a maximum bending angle of at least 75°.

13. The cross member as recited in claim 1 wherein the outer beam is hot stamped from a steel tailor welded blank or from a steel tailor rolled blank.

14. The cross member as recited in claim 1 wherein the outer beam is hot stamped from a steel tailor welded blank having a central beam portion made in Ductibor 1000 ® and two side beam portions made of Usibor 1500®.

* * * * *